United States Patent
DiSalvo

(10) Patent No.: US 8,057,255 B1
(45) Date of Patent: Nov. 15, 2011

(54) CONNECTOR WITH A BATTERY SANDWICHED BETWEEN A HOUSING AND A PRINTED CIRCUIT BOARD

(75) Inventor: Jason DiSalvo, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/896,362

(22) Filed: Oct. 1, 2010

(51) Int. Cl.
*H01R 3/00* (2006.01)
(52) U.S. Cl. ........................................... 439/500
(58) Field of Classification Search ............ 439/500, 439/884, 625, 627, 754; 429/100, 178
See application file for complete search history.

(56) References Cited

U.S. PATENT DOCUMENTS

| | | | |
|---|---|---|---|
| 5,931,693 A | 8/1999 | Yamazaki | |
| 5,980,309 A * | 11/1999 | Frantz et al. | 439/500 |
| 6,589,688 B2 | 7/2003 | Jorgensen et al. | |
| 6,733,327 B2 | 5/2004 | Sugimoto et al. | |
| 6,762,375 B2 | 7/2004 | Haussmann | |
| 6,887,097 B2 | 5/2005 | Nakagawa | |
| 7,175,677 B2 | 2/2007 | Miller et al. | |
| 2009/0017673 A1* | 1/2009 | Chen et al. | 439/500 |

OTHER PUBLICATIONS

Mercedes Benz transmitter photograph, available before Oct. 1, 2010.
Porsche transmitter photograph, available before Oct. 1, 2010.

* cited by examiner

*Primary Examiner* — Chandrika Prasad
(74) *Attorney, Agent, or Firm* — Fay Sharpe LLP

(57) ABSTRACT

A connector for a battery powered electric apparatus comprising a housing including a base and side walls. A first contact is disposed on the housing base. A printed circuit board opposes the base and sandwiches a button battery therebetween. The first contact is in electrical communication with the printed circuit board. A second contact is between the button battery and the printed circuit board and is in electrical communication with each. The second contact is configured such that depression of a switch associated with the printed circuit board translates a rotational force on the button battery communicated through the second contact.

20 Claims, 3 Drawing Sheets

U.S. 8,057,255 B1

CONNECTOR WITH A BATTERY SANDWICHED BETWEEN A HOUSING AND A PRINTED CIRCUIT BOARD

BACKGROUND

The present disclosure relates generally to a battery connector assembly. More particularly, it relates to a connector assembly for a button type battery for use, for example, in combination with a keyless remote. However, it should be appreciated that the present battery connector assembly is suitable for any battery powered device including an activation switch.

Batteries are used for a variety of purposes. For example, battery units are often used in portable electronic devices such as remote control keys for automobiles, allowing a user to lock or unlock car doors and perform a variety of other functions without using a key. Such devices have become increasingly popular in recent years.

Many automotive manufacturers provide remote keyless entry systems with the vehicles they sell. These keyless entry systems contain a keyless transmitter that allows a user to activate door locks, trunk or other functions of the vehicle by pressing buttons on the keyless transmitter. Keyless entry transmitters typically use a button cell batter as the power source. The battery is often connected to a printed circuit board by means of metal springs that are soldered directly to the printed circuit board or attached to the transmitter housing.

U.S. Pat. No. 7,175,677 describes an exemplary battery connector assembly for a keyless remote device. As shown in FIG. 1, a battery unit 10 includes an upper housing 12 and a lower housing (not shown). A printed circuit board 18 includes a positive battery contact 20 and a negative battery contact 22 which, along with the other circuit board components (not shown), form a printed circuit board assembly 19. The positive battery contact 20 and the negative battery contact 22 both contact battery 24, with the positive battery contact 20 contacting a positive end 40 of the battery 24 and the negative battery contact 22 contacting a negative end 42 of the battery, supplying power to the battery unit 10.

When a button cell battery is mounted in the manner described above, a condition that is commonly called fretting corrosion can occur. Particularly, small scratches that are caused by vibration of the battery against the contacts can develop on the battery surface. Corrosion can develop in the scratched area that can lead to poor electrical contact between the battery and the printed circuit board. This poor connection can cause intermittent or faulty operation of the keyless entry system.

SUMMARY OF THE DISCLOSURE

Various details of the present disclosure are hereinafter summarized to provide a basic understanding. This summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

According to one embodiment, a connector for a battery powered electric apparatus is provided. It includes a housing having a base wall and a side wall. A first contact is disposed on the base wall. A printed circuit board opposes the base wall and sandwiches a battery therebetween. The first contact is in electrical communication with the printed circuit board. A second contact is located between the battery and the printed circuit board and forms an electrical communication therewith. The second contact is configured such that movement of the printed circuit board translates a rotational force on the battery.

According to another embodiment, a button-type battery connection is provided. The connection has a housing including a first wall. A printed circuit board opposes the first wall with a button battery located between the printed circuit board and the first wall. A first contact is provided to form an electrical connection between the button battery and the printed circuit board. A second contact is disposed on the printed circuit board and forms an electrical connection between the button battery and the printed circuit board. The second contact comprises at least two elongated arms engaging the button battery at an acute angle relative to a tangent to a periphery of the button battery.

According to a further embodiment, a keyless entry transmitter is provided. The transmitter includes a housing with a base and a side wall. A first contact is disposed on the base, a printed circuit board opposes the base and sandwiches a button battery therebetween. The first contact is in electrical communication with the printed circuit board. A second contact is disposed between the button battery and the printed circuit board and is in electrical communication with each. The end of the first contact engaging the battery is relatively more rounded than an end of the second contact engaging the battery. The second contact is configured such that depression of a switch associated with the printed circuit board translates a rotational force on the button battery communicated through said second contact.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
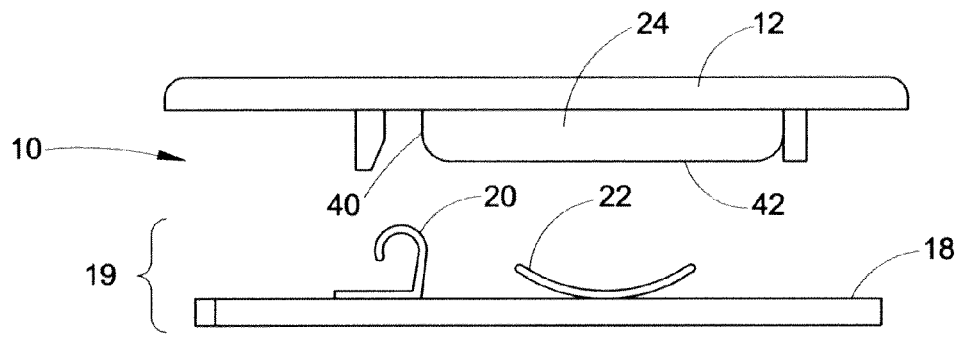
FIG. 1 is a perspective view of a prior art button battery connector assembly.

One or more embodiments or implementations are hereinafter described in conjunction with the drawings, where like reference numerals are used to refer to like elements throughout, and where the various features are not necessarily drawn to scale.

Figure 2:
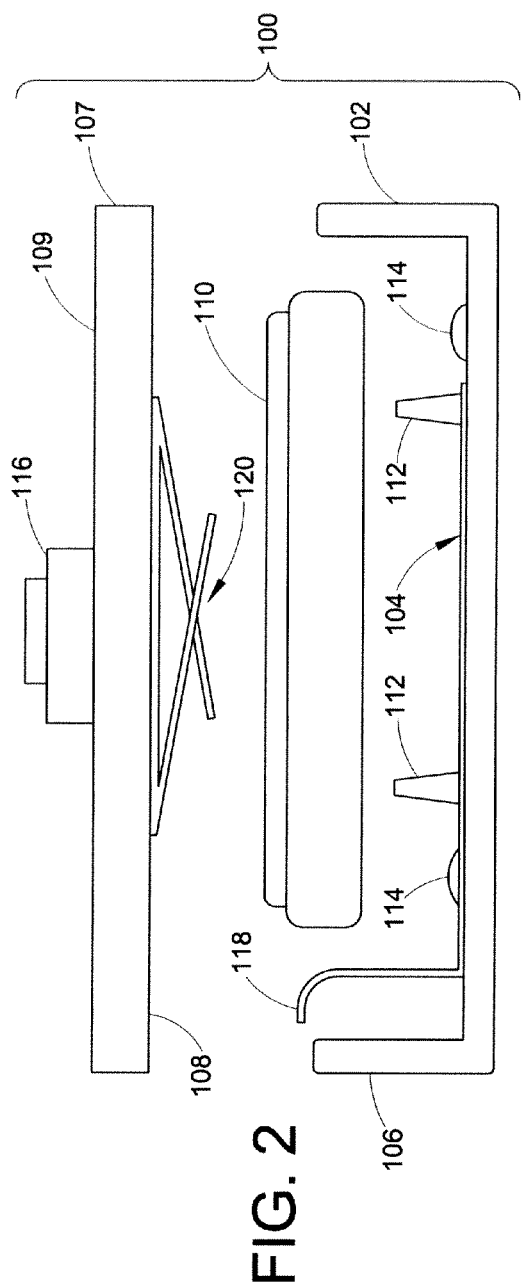
FIG. 2 is an exploded side elevation cross-sectional view of the present connector assembly.
Figure 3:
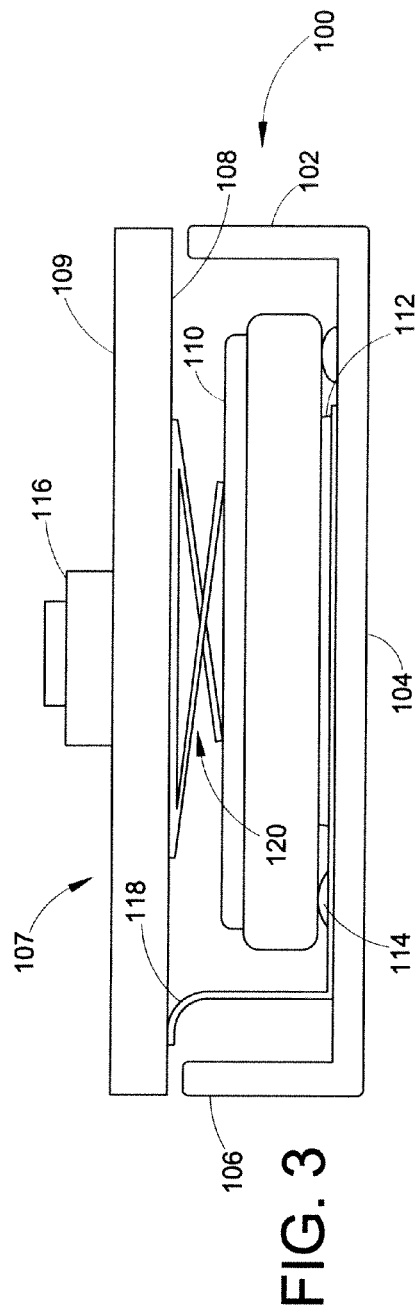
FIG. 3 is an assembled side elevation cross-sectional view of the connector assembly.

Referring now to FIGS. 2 and 3, an embodiment of the battery connector assembly is depicted. Battery connector 100 includes a housing 102 having a base 104 and side wall 106. A top element 107 includes a printed circuit board 108 and an exterior surface 109. A button battery 110 is received within the housing 102. Button battery 110 rests on low friction contacts 112 and is supported by slide surface protrusions 114. Low friction contacts 112 can have a smooth surface engaging the button battery to reduce resistance to rotation thereof. The slide surface can be formed of a material with a low tack (such as polycarbonate). Furthermore, it may be desirable that the surface area of contact between the slide surface protrusions 114 and the button battery 110 be kept to a minimum. This can be achieved, for example, by shaping protrusions 114 as domes, wherein a generally rounded surface engages the button battery 110. The low friction contacts 112 are in electrical communication with base terminal 118, which in turn is in electrical communication with the printed circuit board 108.

Figure 4:
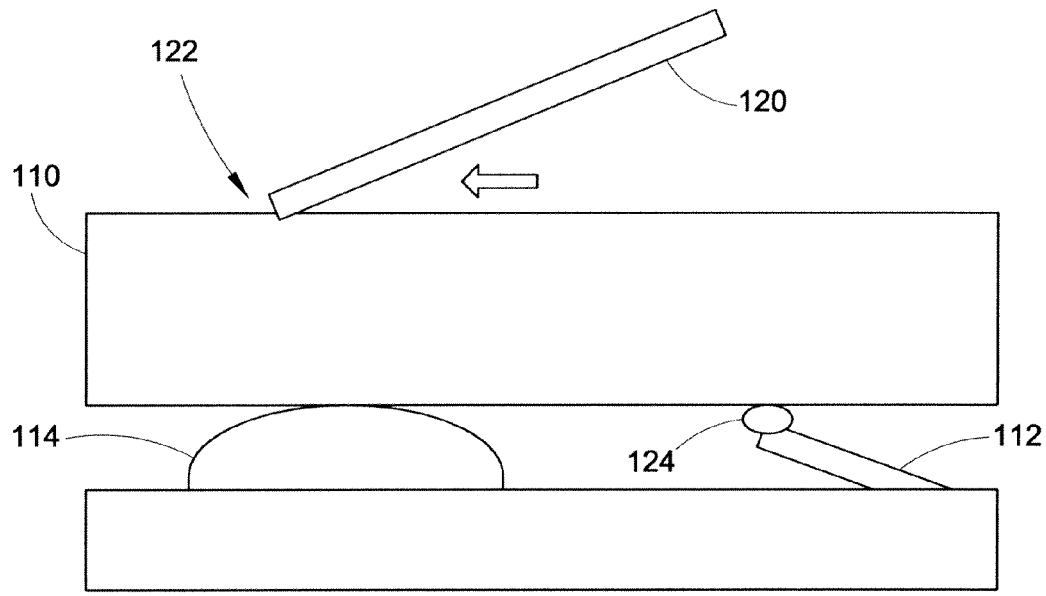
FIG. 4 is a detailed view of the contacts of the connector assembly.

Referring now to FIG. 4, the battery contacts 120 are shaped to create a relatively high friction interface between the contact and the battery. This can be achieved by providing contacts 120 with a sharp or pointed end 122. When a switch 116 is depressed by a user, the electronic circuit is closed. Furthermore, there is depression and/or flexing of the printed circuit board 108 causing the contacts 120 to flex towards the surface of the battery 110. The relatively sharp end 122 of contact 120 can at least minimally penetrate the surface of the battery 110 and urge rotation thereof. To facilitate rotation, the battery engaging edge 124 of low friction contacts 112 can be provided with a rounded surface.

Figure 5:
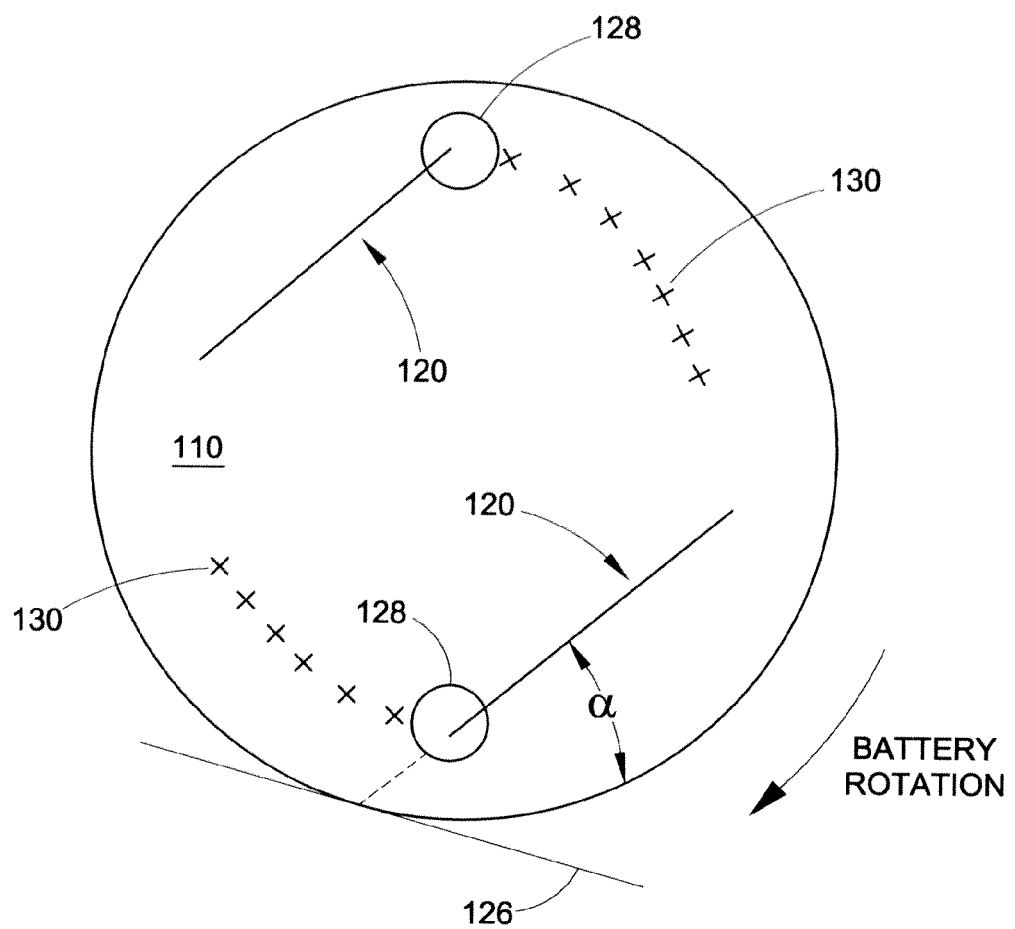
FIG. 5 is a schematic illustration of the function of the connector assembly.

This operation is visually depicted in FIG. 5, wherein contacts 120 engage the surface of button battery 110. The elongated contacts 120 are oriented to engage the button battery surface at an acute angle "α" relative to tangent 126 on the button battery periphery. In this manner when a switch on the device exterior is depressed a force is communicated through the contacts 120 resulting in a rotational translation of the button battery. According to one embodiment, 2-4 contacts that engage the battery relatively close to its periphery are believed sufficient to achieve the desired rotation.

When the keyless transmitter switch is released by the user, the printed circuit board relaxes and the battery contacts return to their original position while the battery remains in its rotated position and a new contact area 128 between the contact and battery is established. This effectively rotates the scratches 130 on the battery surface that are caused by repeated small vibrations of the keyless transmitter that can lead to corrosion. By promoting a rotational movement of the battery when the keyless transmitter switch is pressed, the electrical contact between the battery and contact is renewed each time the user presses the switch. Therefore the entire surface of the battery along a circular path is used as the electrical contact of the keyless transmitted over the lifetime of the battery. This reduces the likelihood of the contacts residing on an area which has experienced corrosion.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

I claim:

1. A connector for a battery powered electric apparatus comprising:
   a housing including a base and a side wall,
   a first contact disposed on said base,
   a printed circuit board facing said base and sandwiching a battery therebetween,
   said first contact in electrical communication with said printed circuit board;
   a second contact disposed between said battery and said printed circuit board and forming an electrical communication therebetween, and
   said second contact configured such that movement of said printed circuit board toward said battery creates a rotational force on said battery.

2. The connector of claim 1 wherein said base includes at least one battery support protrusion.

3. The connector of claim 1 wherein said second contact includes a high friction surface engaging said battery.

4. The connector of claim 1 wherein said second contact comprises at least two contacts.

5. The connector of claim 4 wherein said second contact comprises at least four contacts.

6. The connector of claim 1 wherein said second contact engages said battery promixate an outer edge.

7. The connector of claim 1 wherein said battery comprises a button type.

8. The connector of claim 2 wherein said support element comprises multiple generally rounded protrusions.

9. The connector of claim 1 wherein said first contact includes a relatively low friction surface engaging said battery.

10. The connector of claim 1 including a switch in communication with said printed circuit board on a side opposed to said second contact.

11. A button-type battery connection comprising:
    a housing including a first wall,
    a printed circuit board opposing said first wall,
    a button battery between said printed circuit board and said first wall,
    a first contact capable of forming an electrical connection between said button battery and said printed circuit board,
    a second contact disposed on said printed circuit board, said second contact capable of forming an electrical connection between said button battery and said printed circuit board, and
    said second contact comprising at least two elongated arms terminating in battery engaging ends, said ends engaging said button battery at an acute angle relative to a tangent to a periphery of the button battery.

12. The connection of claim 11 wherein said first contact includes generally rounded battery engaging ends.

13. The connection of claim 11 wherein said first wall includes a plurality of projections supporting said button battery.

14. The connection of claim 13 wherein said projections includes generally rounded surfaces.

15. The connection of claim 11 including an external switch in electrical contact with said printed circuit board.

16. A keyless entry transmitter comprising:

a housing including a base and side wall, a printed circuit board opposing said base and sandwiching a button battery therebetween, a first contact in electrical communication with said printed circuit board, a second contact located between said button battery and said printed circuit board and in electrical communication therewith, an end of said first contact engaging said battery is relatively more rounded than an end of said second contact engaging said battery;

said second contact configured such that depression of a switch associated with said printed circuit board creates a rotational force on said button battery communicated through said second contact.

17. The transmitter of claim 16 wherein said button battery is supported by multiple rounded protrusions.

18. The transmitter of claim 16 wherein said second contact comprises at least two elongated arms.

19. The transmitter of claim 18 wherein said second contact comprises at least four elongated arms.

20. The transmitter of claim 16 wherein said first contract comprises a single elongated arm.

* * * * *